UNITED STATES PATENT OFFICE.

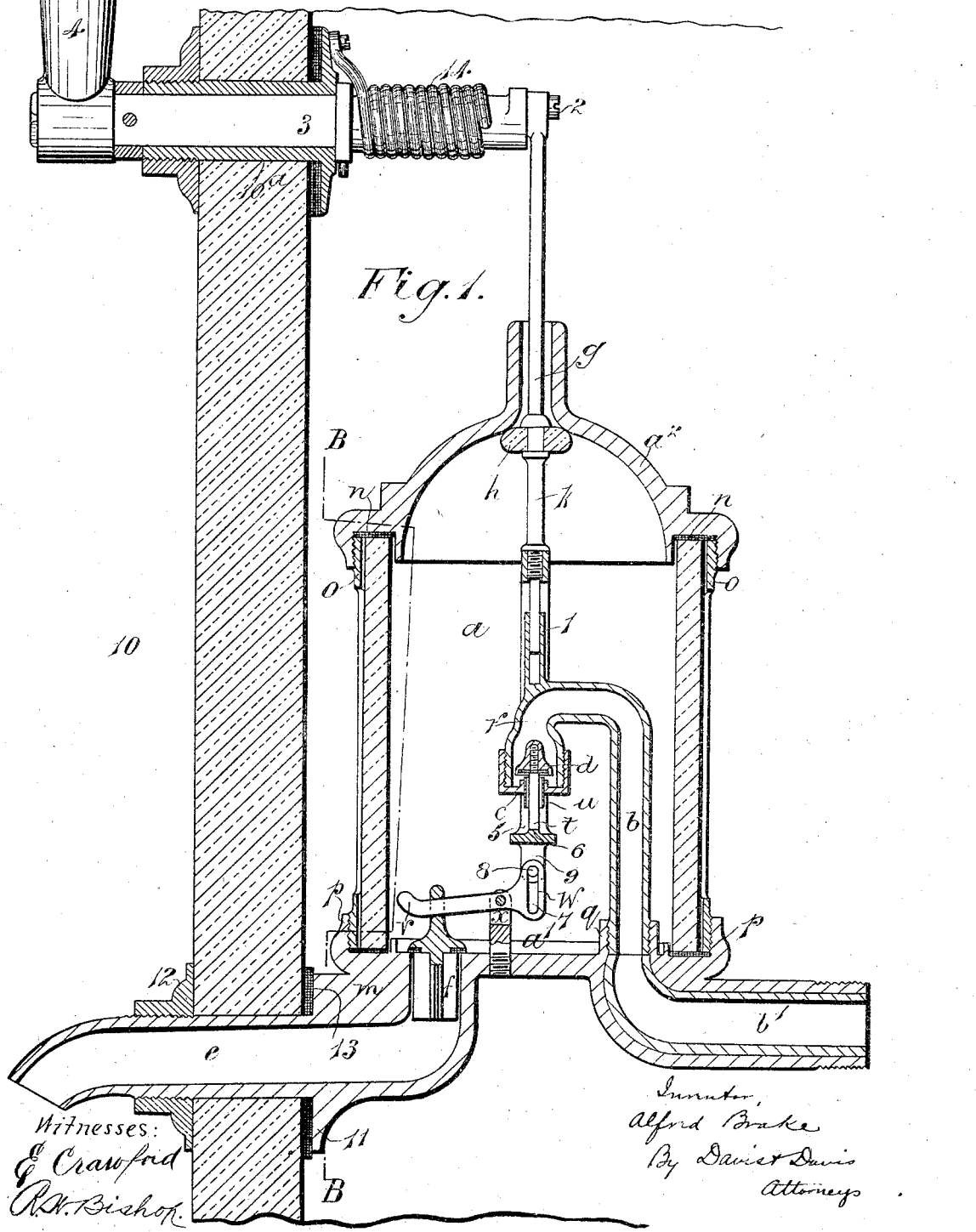

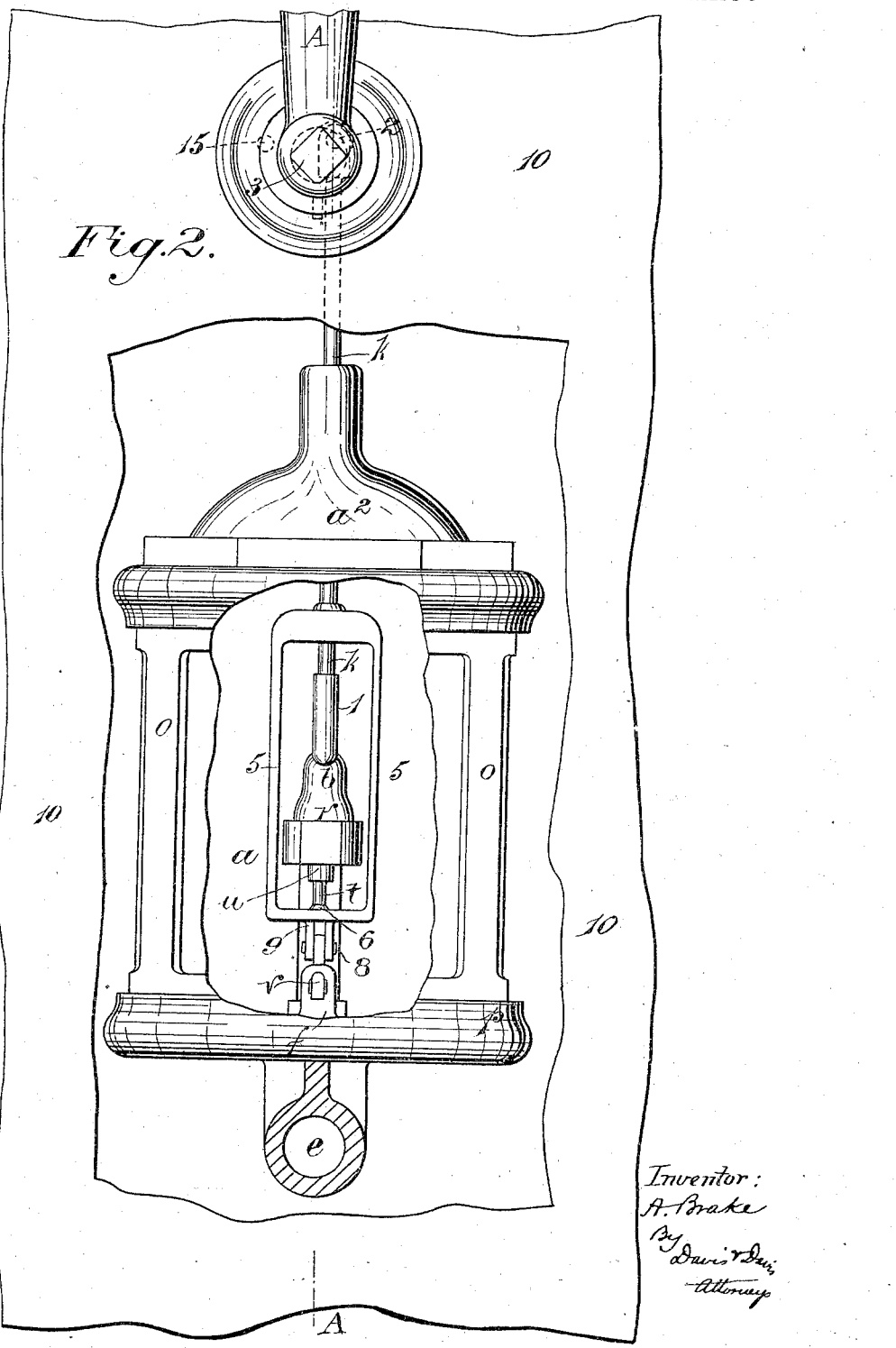

ALFRED BRAKE, OF WELLINGTON, NEW ZEALAND.

APPARATUS FOR DRAWING OFF LIQUIDS.

SPECIFICATION forming part of Letters Patent No. 725,211, dated April 14, 1903.

Application filed July 23, 1901. Serial No. 69,416. (No model.)

*To all whom it may concern:*

Be it known that I, ALFRED BRAKE, a subject of the King of Great Britain and Ireland, residing at Wellington, in the Colony of New Zealand, have invented Improvements in Apparatus for Drawing Off Liquids, of which the following is a specification.

This invention has reference to improvements in that kind of apparatus for drawing off liquids in which a vessel, commonly called an "intermediate" vessel, is normally in communication with the liquid-storing vessel through a passage controlled by an inlet-valve, so that it will stand charged with liquid ready to be drawn off, is provided at its lower end with a discharge passage that is normally closed by an outlet-valve, and is adapted to have its upper part, which is normally disconnected from the external atmosphere, placed in communication with such atmosphere when required through a passage controlled by a valve, so as to allow of gas under pressure within the vessel being released previous to opening the liquid-outlet passage in order to prevent the liquid being discharged under too great a pressure.

The present invention has for its object to provide a simple, reliable, and easily-worked apparatus of the kind referred to whereby aerated liquids can be rapidly drawn off in an advantageous manner and cool condition from the intermediate vessel.

With this and other objects in view the invention consists in certain novel features of construction and combinations and arrangement of parts, all as hereinafter fully described, and more particularly pointed out in the claims.

In the accompanying illustrative drawings, Figure 1 is a vertical section on the line A A of Fig. 2; and Fig. 2 is a front elevation, partly in section, on the line B B of Fig. 1, showing apparatus constructed according to this invention for drawing off aerated liquid in a cool condition.

$a$ is a stationary intermediate vessel provided with a liquid-inlet pipe $b$, terminating within the vessel in an opening $c$ (hereinafter called the "liquid-inlet passage") and controlled by a liquid-inlet valve $d$, with a liquid-outlet pipe $e$ extending from its bottom part $a'$ and controlled by a liquid-outlet valve $f$, and with an opening $g$, that extends through its top part $a^2$ and serves for the exit of gas under pressure from the top of the vessel previous to drawing off the liquid contents thereof and for the entrance of air during such drawing off, this passage, hereinafter called for distinction the "gas-passage," being controlled by a valve $h$, hereinafter called the "gas-valve." $k$ is a valve-rod that extends through the top of the vessel and is adapted when depressed by suitable operating means to first open the said gas-valve $h$ and allow gas under pressure in the top of the vessel to escape, to then cause or allow the said inlet-valve $d$ to close and cut off the supply of liquid to the vessel, and finally to open the outlet-valve $f$ and allow the liquid contents of the vessel or a part thereof to be drawn off, the valves moving in the reverse order when the valve-rod is raised, so as to first close the liquid-outlet, to then open the liquid-inlet, and finally to close the gas-passage.

In the example shown the intermediate vessel $a$ is made in three main parts, viz: an intermediate part $a$ and top and bottom parts $a'$ and $a^2$, that are secured together in a fluid-tight manner in any convenient way—as, for instance, by interposing packing-rings $m$ and $n$ of suitable material, such as india-rubber or leather, between the adjacent parts $a$ $a'$ $a^2$, surrounding the intermediate part $a$, which may be of cylindrical shape, as shown, with a sleeve $o$, that is screwed at its lower end in a socket $p$ on the upper side of the lower part $a'$ and screwing the top part $a^2$ to the top of the sleeve. By this construction the intermediate vessel can be easily built up and can also be easily taken apart when this may be necessary to gain access to the parts within it. The liquid-inlet pipe $b$ is screwed into a socket $q$ on the bottom part $a'$, so as to be in communication with a pipe $b'$, that is preferably cast in one piece with the said bottom part and is adapted to be connected to a liquid-supply pipe extending from the vessel containing the main supply of liquid to be drawn off. The inlet-pipe $b$ extends upward into the vessel $a$, its delivery end being bent over and enlarged to form a valve-chamber $r$, the bottom of which is provided with the liquid-inlet passage $c$, controlled by the liquid-inlet valve $d$. This valve is provided with a downwardly-extending stem $t$, that is preferably guided by a tube $u$, fixed in the bottom of the valve-chamber $r$ and serves as the liquid-inlet passage. The liquid-outlet pipe $e$ is inclined downward, so that liquid will readily drain away therefrom, and is bent to form a spout. Its upper end is controlled by the liquid-outlet valve $f$, which is made as a lift-valve and is adapted to be raised by one arm $v$ of a lever that is pivoted to a lug $x$ on the bottom part $a'$ of the vessel and has its other arm $w$ terminating below the valve-chamber $r$.

The gas-valve $h$ is located within the vessel $a$ and is fixed to the valve-rod $k$, which extends through the gas-passage $g$ and works at its lower end in a guide 1 on the inlet-pipe $b$, its upper end being connected to suitable operating means, which in the example comprises a crank-pin 2 on a spindle 3, provided with an operating-handle 4, the arrangement being such that when the valve-rod is depressed sufficiently it will open the gas-valve $h$ suddenly, as and for the purposes hereinbefore described. To the valve-rod $k$ is fixed a rectangular-shaped frame 5, that embraces the valve-chamber $r$ and is provided with a projection 6, which when the gas-valve $h$ is closed acts against the valve-stem $t$ and holds the liquid-inlet valve $d$ in its raised and open position. The said frame 5 is arranged above the arm $w$ of the valve-operating lever $v$ $w$, so that when it is depressed it will, after opening the gas-valve $h$ and allowing of escape of gas under pressure from the top of the vessel and releasing the inlet-valve $d$ and allowing the same to be closed by gravity, aided by the pressure of the liquid in the inlet-pipe $b$, act upon the arm $w$ of the lever $v$ $w$ and depress the same, so as to open the liquid-outlet valve $f$ and allow the liquid contents of the vessel or a part thereof to be drawn off. When the valve-rod is raised, the outlet-valve $f$ will close by gravity, the frame 5 will raise and open the liquid-inlet valve $d$, and the gas-valve $h$ will be caused to close the gas-passage $g$. To insure the closing of the liquid-outlet valve $f$, the arm $w$ of its lever may be formed with a slot 7, into which extends a pin 8, carried by a bracket 9 on the under side of the frame 5, the arrangement being such that in the event of the arm $w$ of the lever remaining down when the valve-rod rises the pin 8 will lift such arm and cause the outlet-valve $f$ to close.

The interior of the vessel $a$ and the various devices therein should be of material that will not readily affect in an injurious manner the liquid admitted thereto. For this purpose the intermediate portion of the vessel may conveniently be of glass. If of metal, it should be lined with material such as tin or silver applied by heat. The upper surface of the bottom part $a'$ and the lower inner surface of the top part $a^2$ should be similarly covered with protective material. The inlet-pipe $b$ may be of silver or tin, as also may the inlet and outlet valves $d$ and $f$, (except their faces, which may be of leather or india-rubber,) the inlet-tube $u$, and the lower part of the valve-rod $k$ and the frame 5. The gas-valve $h$ may be of india-rubber.

For the purpose of enabling the liquid contents of the vessel $a$ to be drawn off in a cold condition the said vessel is fixed within a receptacle 10—such, for example, as a marble box—that is charged with ice or other cooling agent, that surrounds the said vessel. The vessel may conveniently be fixed to the front wall of the receptacle 10 by means of its liquid-outlet pipe $e$, which for this purpose is formed with a shoulder 11 to bear against the inner side of the said front wall and is provided with a screw-nut 12 to bear against the outer side of the said wall, a packing-ring 13 serving to insure a good joint between the connected parts without injuring the wall of the receptacle. In this case the valve-operating spindle 3 is mounted to turn, but not to move endwise, in a bearing $10^a$ in the said front wall of the ice-receptacle, its outer end being provided with the handle 4. A spring 14 may be provided to cause the handle to automatically return to its normal position and raise the valve-rod after the same has been depressed and released, and a stop 15 may be provided to limit the turning movement of the handle 4 in a downward direction.

It will be evident that various changes can be made in the details of construction of my apparatus without departing from the spirit and scope of the invention so long as the relative arrangement of parts shown in the drawings or the mode of operation described in the specification is preserved.

What I claim is—

1. Apparatus for drawing off liquid, comprising a stationary vessel having a liquid-outlet passage extending from its lower part and a gas-passage through its upper part, a liquid-outlet valve and a gas-valve controlling said liquid-outlet and gas passages respectively, a liquid-inlet pipe having a liquid-inlet passage terminating within the central portion of said vessel, a lift-valve controlling said inlet-passage and provided with a depending stem, a lever fulcrumed to said vessel and having one end engaged with said outlet-valve, a valve-rod extending through said gas-passage and carrying said gas-valve, and a valve-operating device carried by said valve-rod and adapted, when raised, to act upon the stem of the liquid-inlet valve and open the same, and to allow the liquid-outlet valve to close, and when depressed, to release said liquid-inlet valve and allow the same to close and to act upon the opposite end of the lever connected to said outlet-valve and open this valve, substantially as described.

2. Apparatus for drawing off liquid, comprising a stationary vessel having a liquid-outlet passage extending from its lower part and a gas-passage through its upper part, a liquid-outlet valve and a gas-valve controlling said liquid-outlet and gas passages respectively, a liquid-inlet pipe having a liquid-inlet passage terminating within the central portion of said vessel, a lift-valve controlling said inlet-passage and provided with a depending stem, a lever fulcrumed to said vessel and having one end engaged with said inlet-valve, a valve-rod extending through said gas-passage and carrying said gas-valve, a valve-operating device carried by said valve-rod and adapted, when raised, to act upon the stem of the liquid-inlet valve and open the same, and to allow the liquid-outlet valve to close, and when depressed, to release said liquid-inlet valve and allow the same to close and to act upon the opposite end of the lever connected to said outlet-valve and open this valve, an ice-receptacle within which said vessel is fixed and through the front wall of which the liquid-outlet passage extends, a hand-operated spindle journaled in the wall of said receptacle, and means carried by said spindle and connected to said valve-rod and whereby said valve-rod and valve-operating device will be raised and lowered when said spindle is moved in opposite directions, substantially as described.

3. Apparatus for drawing off liquids, comprising an intermediate vessel the lower part of which is provided with a liquid-inlet pipe and with a liquid-outlet pipe, and the upper part of which is provided with a vertical gas-passage, one portion of said inlet-pipe extending upward into said vessel and terminating in a valve-chamber provided with a liquid-inlet passage, and the remaining portion of said inlet-pipe extending from the lower side of the said bottom part of the vessel from which the liquid-outlet pipe also extends, an inlet-valve located in said valve-chamber so as to control the passage leading therefrom and having a depending stem, an outlet-valve located in said vessel and controlling said outlet-pipe, a lever pivoted to the lower part of said vessel and having one arm engaged with said outlet-valve and its second arm terminating below said valve-box, a valve-rod extending through said gas-passage, means for raising and lowering said valve-rod, a gas-valve carried by said rod and adapted to close said gas-passage when the rod is raised, and means connected to said valve-rod and adapted when raised to lift and open said inlet-valve through its stem and release said outlet-valve, and when lowered, to release said inlet-valve and depress the second arm of said lever and open the outlet-valve, substantially as described.

4. In apparatus for drawing off liquid, an intermediate vessel provided with a liquid-inlet pipe terminating in a valve-chamber located within the central portion of said vessel, with a liquid-outlet pipe extending from its lower part, and with a vertical gas-passage extending through its upper part, a liquid-inlet valve located in said valve-chamber, arranged to control the liquid-inlet passage therefrom, and provided with a depending stem, a liquid-outlet valve controlling the inner end of said liquid-outlet passage, a lever pivoted to the bottom of said vessel and having one arm engaging said outlet-valve and its second arm terminating below said valve-chamber, a valve-rod extending through said gas-passage, a gas-valve fixed to said valve-rod and controlling said gas-passage, a guide for the lower end of said valve-rod, a frame attached to said valve-rod and having its lower end adapted, when said rod is raised, to act upon the stem of said inlet-valve and lift and open the same, and when depressed, to act upon the second arm of said lever and open the outlet-valve, and means for raising and lowering said rod and frame, substantially as described.

5. Apparatus for drawing off liquids, comprising an intermediate vessel having liquid inlet and outlet pipes attached to its lower part and a central gas-passage through its upper part, valves for controlling said pipes and passage, a valve-rod extending through said gas-passage and adapted to operate said valves in the manner set forth, an ice-receptacle within which said vessel is located and through the front wall of which said liquid-outlet pipe extends, means for fixing said outlet-pipe to said wall, a spindle mounted to rotate in a bearing in said wall and provided at its outer end with a handle, an eccentric device mounted on the inner end of said spindle and connected to said valve-rod, and a spring adapted when said handle is released, to rotate said spindle and raise the valve-rod and attached parts and return said handle to its normal position, substantially as described.

Signed at 77 Cornhill, London, E. C., this 5th day of July, 1901.

ALFRED BRAKE.

Witnesses:
WM. O. BROWN,
IRENÊO FRANCO VELHO.